United States Patent [19]

Dalferth et al.

[11] Patent Number: 4,505,103
[45] Date of Patent: Mar. 19, 1985

[54] CHAIN JOINT FOR LINK CHAINS

[75] Inventors: Hans H. Dalferth, Aalen-Wasseralfingen; Johannes Bauer, Essingen, both of Fed. Rep. of Germany

[73] Assignee: RUD-Kettenfabrik Rieger & Dietz GmbH u. Co., Aalen, Fed. Rep. of Germany

[21] Appl. No.: 465,328

[22] Filed: Feb. 9, 1983

[30] Foreign Application Priority Data

Feb. 26, 1982 [DE] Fed. Rep. of Germany ....... 3207629

[51] Int. Cl.³ ............................................. F16G 13/06
[52] U.S. Cl. ............................................. 59/85; 59/86
[58] Field of Search .................... 59/86, 85, 87, 88, 93, 59/78, 84; D8/499

[56] References Cited

U.S. PATENT DOCUMENTS 2,353,940  7/1944  Staats ........................................ 59/85
2,359,535  10/1944 Staats ........................................ 59/84
2,819,586  1/1958  Pierre ....................................... 59/85

FOREIGN PATENT DOCUMENTS 694016   6/1940  Fed. Rep. of Germany .......... 59/85
1197291  7/1965  Fed. Rep. of Germany .......... 59/84
1901367  2/1971  Fed. Rep. of Germany .......... 59/85
2204     of 1907 United Kingdom ..................... 59/85
337085   10/1930 United Kingdom ..................... 59/84
1193647  6/1970  United Kingdom ..................... 59/85

Primary Examiner—Daniel C. Crane
Assistant Examiner—David B. Jones
Attorney, Agent, or Firm—Parmelee, Bollinger & Bramblett

[57] ABSTRACT

In a chain joint which consists of two identical, essentially U-shaped joint halves (1,2), the outer legs (3) and the inner legs (4) of the joint halves are provided with holding teeth (14–16 and 17–19 respectively). The holding teeth are here designed with unequal thickness, in such a way that certain pairs of holding teeth (15, 18) absorb a greater load than the other pairs of holding teeth (14,19,16,17). Due to the chosen arrangement, those zones of the outer legs (3) which are located most closely to the shackle base (9) of the joint halves (1,2) are noticeably relieved, and a premature rupture of the chain joint is prevented in this way.

23 Claims, 19 Drawing Figures

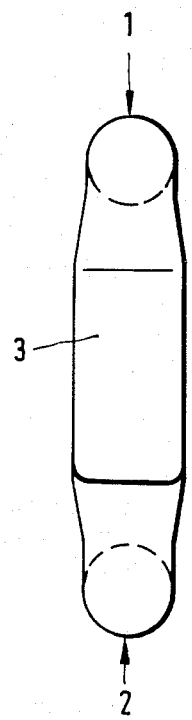
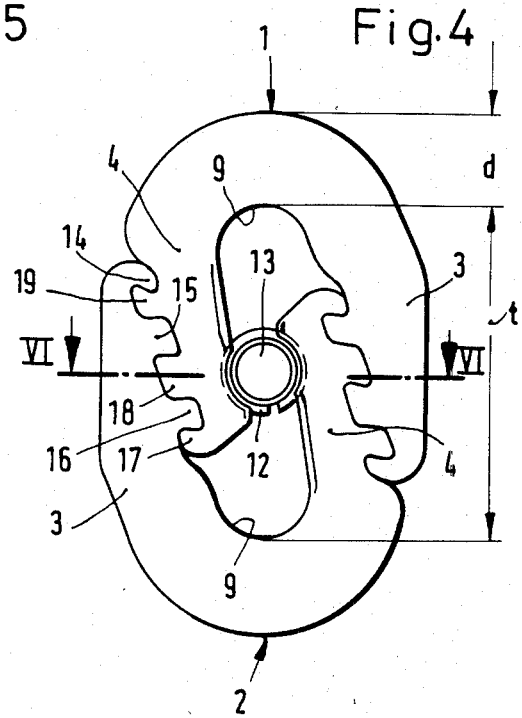
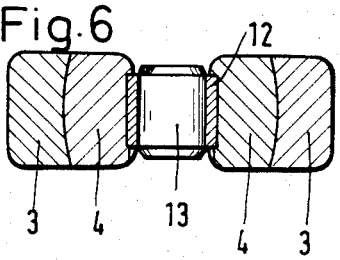
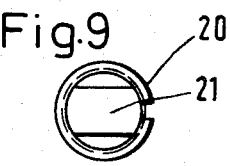
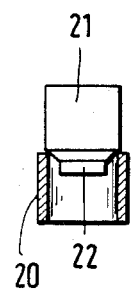
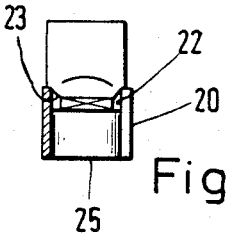
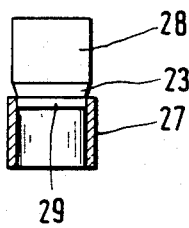

CHAIN JOINT FOR LINK CHAINS

BACKGROUND OF THE INVENTION

The invention relates to a chain joint for link chains, having two identical, substantially U-shaped joint halves which are releasably connected to one another and each have an inner leg and an outer leg, the mutually facing sides of the inner and outer legs being connected to one another in the closed position of the joint by at least two in each case and at most four pairs of holding teeth in each case, and a supporting element for the joint halves being arranged between the mutually facing sides of the inner legs.

From German Patent Specification No. 1,901,367, a chain joint of the abovementioned type is known, wherein the inner and outer legs are connected to one another by two pairs of holding teeth formed with teeth of substantially the same thickness. It has been found that the strength of the known chain joint does not reach the desired values and that, inspite of the use of comparatively strong outer legs, the chain link breaks in the zone of the holding tooth of the outer leg, which is located most closely to the shackle base of the joint halves. If it is taken into account that the cross-section of the outer legs is greatest at the point of rupture, the conclusion can be drawn that stress peaks arise at the said point. Efforts to control the stress peaks by enlarging the cross-section of the outer legs had to be unsuccessful, if only because the dimensions of the chain joint must match the dimensions of the chain links belonging to the chain joint, that is to say because they must not differ too widely from the latter, in particular with respect to their external shape, since they must pass over the same chain wheels as the chain links. The indicated difficulties have had the result that chain joints of the generic type under discussion have been unable to gain acceptance in practice, inspite of numerous advantages.

SUMMARY OF THE INVENTION

It is the object of the invention to provide a chain joint of the type under consideration, the strength of which is increased over that of known relevant chain joints by an improved distribution of the forces to be transmitted between the joint halves over the holding teeth. According to the invention this object is achieved when, in the case of two holding teeth per outer and inner leg, in each case the holding tooth, which is located most closely to the shackle base of the particular joint half, of the inner leg and the holding tooth, interacting with the former, of the outer leg and, in the case of three or four holding teeth per outer and inner leg, in each case the middle holding tooth or the two middle holding teeth of each leg are designed to be thicker than the holding teeth of the remaining pairs of holding teeth.

In the chain joint according to the invention, those holding teeth of thicker design which are regularly located most closely to the centre of the chain joint possess a greater rigidity than the other holding teeth. The consequence of the increased rigidity is that the proportion of the forces to be transmitted by the thicker holding teeth increases as compared with the forces to be transmitted by the remaining holding teeth. This leads to a relief even of those holding teeth of the outer legs which are located most closely to the shackle base of the chain joint halves and reduces the risk of premature ruptures at the abovementioned critical points.

An additional improvement in the force or stress conditions in the chain joint can be obtained when, with the chain joint unstressed, a clearance which can be reduced by the stress and which in practice is preferably 0.05–0.06 mm is present in each case between that holding tooth of the inner leg which is located most closely to the end of the inner leg and the associated holding tooth of the outer leg.

BRIEF DESCRIPTION OF THE DRAWINGS

Further details and features of the chain joint according to the invention can be seen from the sub-claims and the description below of several illustrative embodiments represented in the attached drawing, in which:

FIG. 4 shows a plan view of a chain joint having three pairs of holding teeth,

FIG. 5 shows a side view of the chain joint according to FIG. 4,

FIG. 6 shows a section along the line VI—VI in FIG. 4,

FIG. 7 shows, partially in section, a first side view of a supporting and locking element consisting of two parts and forming a pre-assembled unit, FIG. 8 shows a second side view, offset by 90° relative to the side view according to FIG. 7, of the supporting and locking element according to FIG. 7, FIG. 9 shows a view from below of the supporting and locking element according to FIGS. 7 and 8, FIG. 10 shows a further supporting and locking element consisting of two parts and forming a pre-assembled unit.

DESCRIPTION OF THE PREFERRED EMBODIMENTS

Figure 1:
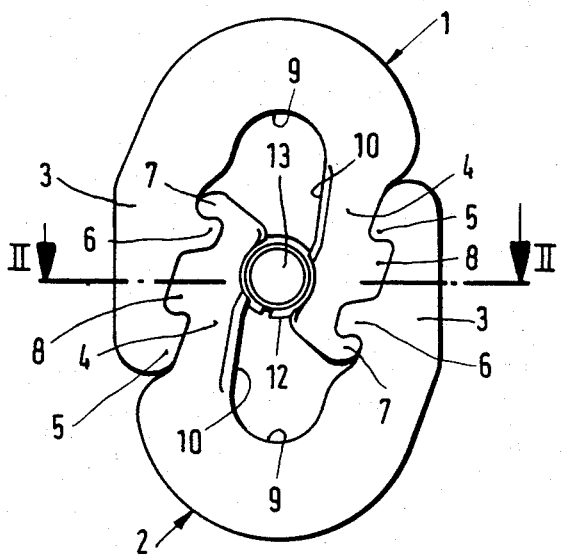
FIG. 1 shows a plan view of a chain joint having two pairs of holding teeth.
Figure 2:
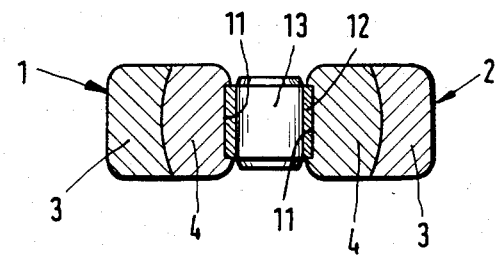
FIG. 2 shows a section along the libe II—II in FIG. 1.

In FIG. 1, 1 and 2 mark two joint halves which have the same shape and each of which has an outer leg 3 and an inner leg 4. The outer legs 3 have two holding teeth 5 and 6, and the inner legs 4 have two holding teeth 7 and 8. As can be seen from the drawing, those holding teeth 7 of the inner leg 4 which are located most closely to the shackle base 9 of the joint halves 1 and 2 and the associated holding teeth 6 of the outer legs 3 are of thinner design than the other holding teeth 5 and 8. Therefore, the holding teeth 5 and 8 take up the main stress of the chain joint integrated into a chain strand.

The mutually facing sides 10 of the inner legs 4 are provided with engagement recesses 11, in which an expansion element 12 can engage which is designed as a tensioning sleeve and which is held in the locking position, that is to say in the engagement recesses, by a bolt-shaped, that is to say cylindrical, supporting element 13 which supports the holding teeth 5 and 8 which absorb the main stress.

Figure 3:
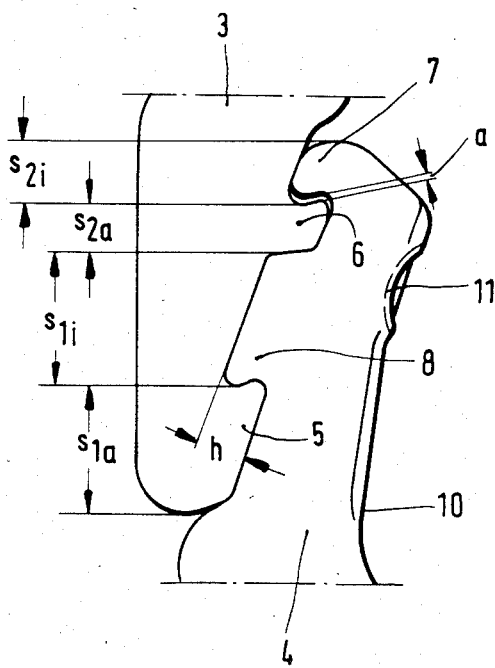
FIG. 3 shows a detail of the chain joint according to FIGS. 1 and 2.
Figure 11:
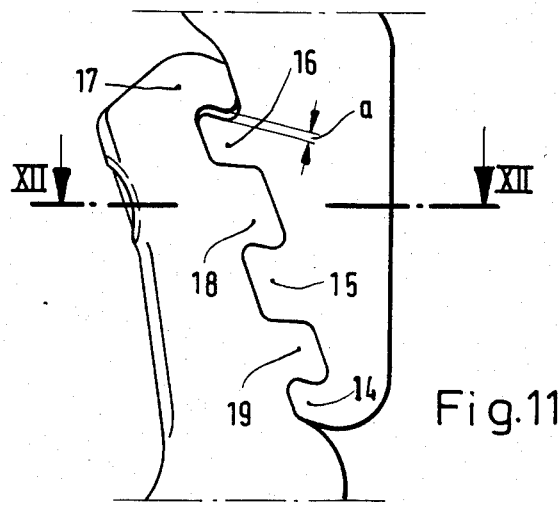
FIG. 11 shows a detail of the chain joint according to FIGS. 4–6.

As can be seen from FIG. 3, the holding teeth 5 and 8 have the same tooth height h and the same tooth thickness $s_{1i}$ and $s_{1a}$. Similar comments apply to the weaker holding teeth 6 and 7, but the tooth thickness $s_{2i}$ and $s_{2a}$ of the latter is smaller than the tooth thickness of the holding teeth 5 and 8, at the same tooth height.

In the unstressed state of the chain joint, there is a small clearance a between the holding teeth 6 and 7, which clearance is reduced under stress and has the consequence that the holding teeth 6 and 7 are stressed only when forces are already being absorbed by the holding teeth 5 and 8.

FIG. 2 shows that the sides, facing the inner legs 4, of the outer legs 3 have a concave shape and the sides, facing the outer leg 3, of the inner legs 4 have a convex shape.

FIGS. 4-12 shows a chain joint which has proved to be particularly advantageous because of the use of three pairs of holding teeth.

Mutually corresponding or comparable parts of the second illustrative embodiment carry the same reference numerals as in the case of the first illustrative embodiment. Consequently, the joint halves are here also marked 1 and 2, and the inner and outer legs are marked 3 and 4. Each outer leg is provided with three holding teeth 14, 15 and 16, and each inner leg is provided with three holding teeth 17, 18 and 19. In the case shown, all the holding teeth have the same tooth height, but the tooth thickness of the holding teeth 15 and 18 is greater than the tooth thickness of the other holding teeth 16, 17 and 14, 19. In this illustrative embodiment also, a clearance a which fulfills the same purpose as in the first illustrative embodiment is present between the holding teeth 16 and 17.

Figure 12:
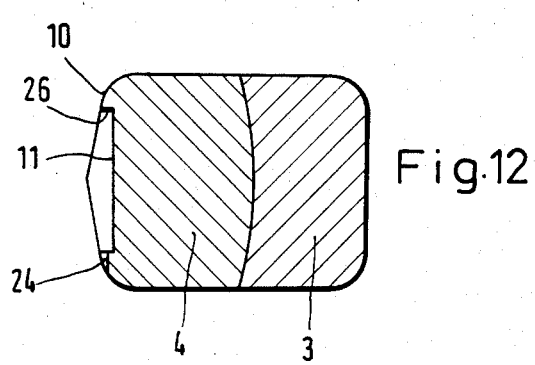
FIG. 12 shows a section along the line XII—XII in FIG. 11.

A special feature of the second chain joint is that, in the latter, a pre-assembled unit consisting of an expansion element 20 and a supporting element 21 which here also has a cylindrical shape is used for locking the chain joint. As can be seen from FIGS. 7 and 8, the expansion element 20 is clamped onto a collar 22 of the supporting element 21. The collar 22 is adjoined by an oblique surface 23. FIG. 12 shows that the surfaces 10 of the inner legs are provided on one side of the engagement recess 11 with a set-back surface 24. The distance between the surfaces 24 of the mutually opposite inner legs is slightly greater than the diameter of the pre-assembled expansion element 20 before its final expansion by the supporting element 21. The pre-assembled unit formed by the supporting element 21 and the expansion element 20 can, in the region of the surfaces 24, be easily transferred into the engagement recess 11, and specifically for such a distance that the end face 25 of the expansion element 20 comes to bear against the shoulder 26 of the engagement recess 11. As soon as this position has been reached, the supporting element 21 is knocked into the expansion element 20, and perfect locking and support are obtained.

Whilst the collar 22 of the supporting element shown in FIGS. 7-9 has parallel side faces, FIG. 10 shows a pre-assembled unit consisting of an expansion element 27 and a supporting element 28, the collar 29 of which has likewise a fully cylindrical shape.

A chain joint having three pairs of holding teeth is particularly suitable in cases where the pitch t of the joint is greater than 3d and smaller than 4d, d being the diameter of the chain joint in the shackle zone or the diameter of the adjoining chain links not shown. The pitch t is defined as the maximum inner length of the chain joint as designated by the letter "t" in FIG. 4.

Figure 13:
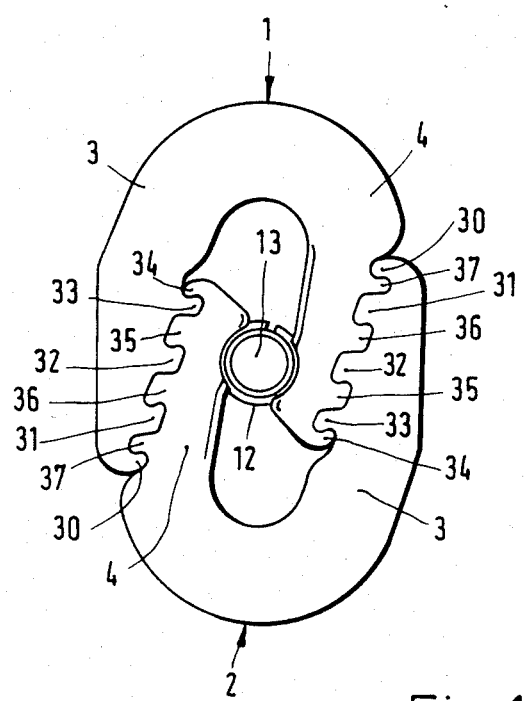
FIG. 13 shows a plan view of a chain joint having four pairs of holding teeth.
Figure 14:
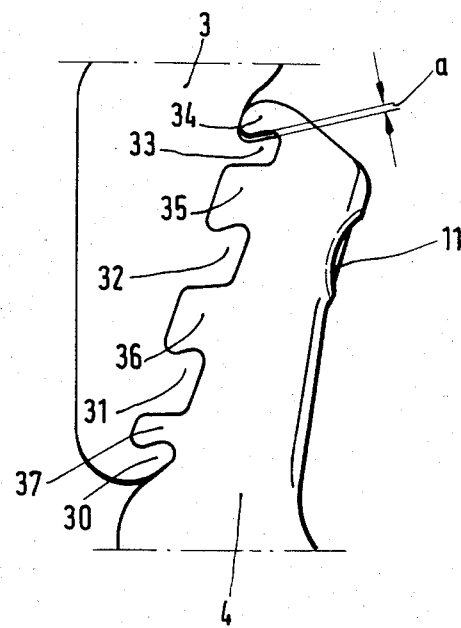
FIG. 14 shows a detail of the chain joint according to FIG. 13.

FIG. 13 shows a chain joint consisting of two joint halves 1 and 2, the outer legs 3 of which each have four holding teeth 30, 31, 32 and 33 and the inner legs 4 of which are likewise each provided with four holding teeth 34, 35, 36 and 37. In this case, the holding teeth 31 and 32 of the outer legs 3 and the holding teeth 35 and 36 of the inner legs 4 are of a thicker design than the other holding teeth. The main stress is thus taken up by the pairs 31, 36 and 32, 35 of holding teeth. A clearance a is again present between the holding teeth 33 and 34.

Figure 15:
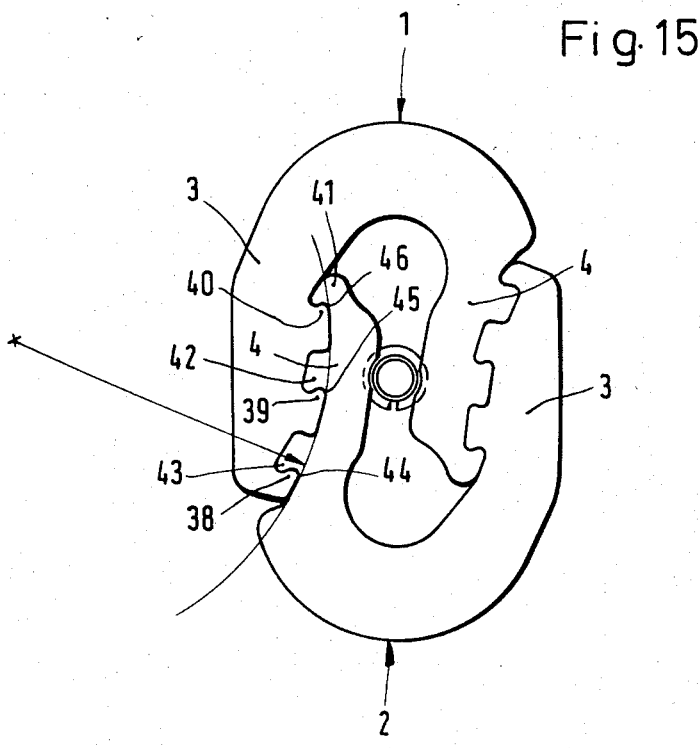
FIG. 15 shows a plan view of a modified chain joint having three pairs of holding teeth.

FIG. 15 shows a chain joint, in which the outer legs 3 and the inner legs 4 of each joint half 1 or 2 have again three holding teeth 38-40 or 41-43 respectively. In this case, the tips 44-46 of the holding teeth 38-40 are located on a circular arc. The same applies to the tips of the holding teeth 41-43 of the inner legs 4. The apex of the circular arc here points in each case towards the centre of the chain joint.

Figure 16:
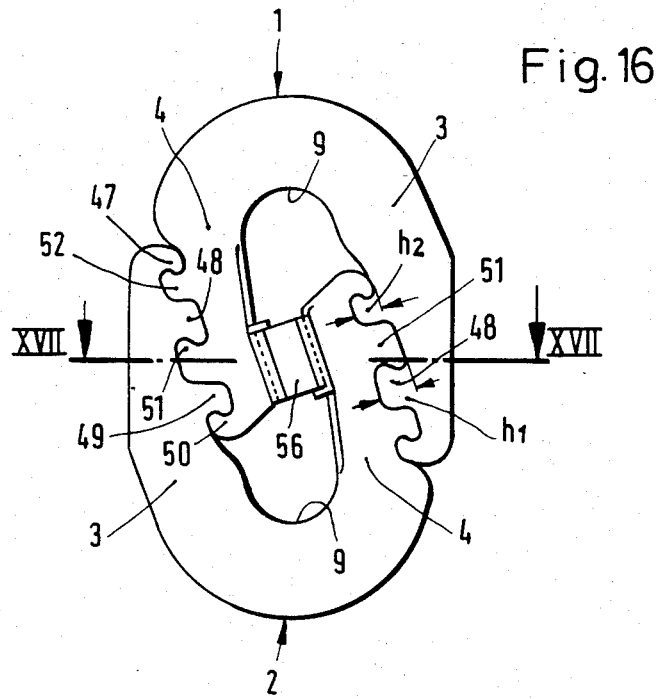
FIG. 16 shows a plan view of a further chain joint having three pairs of holding teeth.

In the chain joints described so far, the holding teeth had substantially the same tooth height h, with different tooth thicknesses s. In FIG. 16, an illustrative embodiment of a chain joint is shown, in which the heights of the holding teeth are different. The outer legs 4 of the chain joint according to FIG. 16 have holding teeth 47-49, and the inner legs 3 have holding teeth 50-52. The pairs of holding teeth 48, 51 are in this case also thicker than the pairs of holding teeth 47, 52 and 49, 50, which are more remote from the centre of the chain joint. As can be seen, the tooth height $h_1$ of the holding teeth 48 and 51 is greater than the tooth height $h_2$ of the holding teeth 49 and 50.

Figure 17:
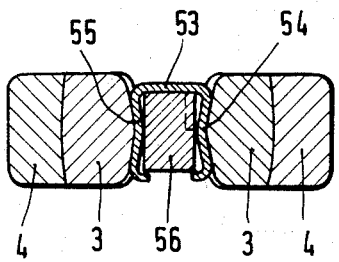
FIG. 17 shows a section along the line XVII—XVII in FIG. 16.

The chain joint according to FIGS. 16 and 17 is locked by means of an expansion element 53 which is formed as a substantially U-shaped tensioning shackle with engagement legs 54 and 55. A supporting element 56 is arranged captively between the engagement legs 54 and 55 of the expansion element 53.

Figure 18:
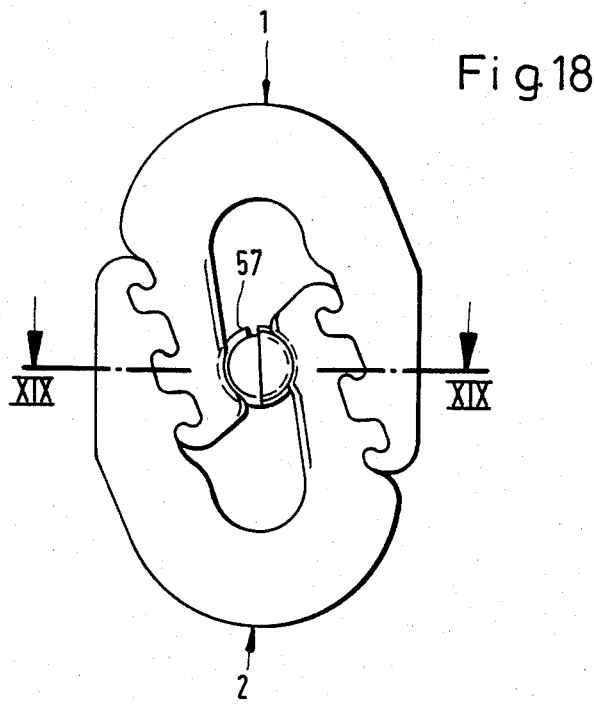
FIG. 18 shows a plan view of a further chain joint having three pairs of holding teeth.
Figure 19:
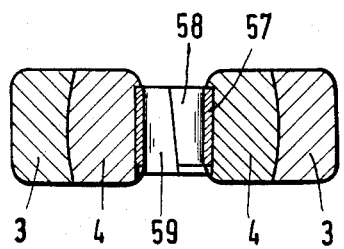
FIG. 19 shows a section along the line XIX—XIX in FIG. 18.

With respect to the design of its joint halves, the chain joint shown in FIGS. 18 and 19 corresponds largely to the chain joint according to FIGS. 4-6. It differs from the chain joint first described only by the type of locking chosen. Although the expansion element 57 is here also formed by a tensioning sleeve, securing is effected in this case by two supporting elements 58 and 59 which have the shape of wedges but which together again form a cylindrical support which is particularly advantageous for supporting the thicker holding teeth.

We claim:
1. Chain joint for link chains, having two identical, substantially U-shaped joint halves which are releasably connected to one another and each have an inner leg and an outer leg with mutually facing sides, the mutually facing sides of the inner and outer legs being connected to one another in a closed locked position by at least two in each case and at most four pairs of holding teeth in each case, and a supporting element for the joint halves being arranged between the mutually facing sides of the inner legs, characterised in that, said holding teeth including a plurality of teeth on each of the outer and inner legs (3,4), said teeth being of at least two different thicknesses as measured in a longitudinal direction relative to said chain joint, said thicker teeth on said inner leg being arranged so as to be more closely located proximate to the center of the chain joint than the less thick teeth on said inner leg, and said thicker teeth on said inner leg cooperating with thicker teeth on said outer leg, such that the proportion of forces transmitted from said thicker teeth on the inner leg to said corresponding thicker teeth on said outer leg is increased while the proportion of forces transmitted through the less thick teeth of said chain joint is decreased.

2. Chain joint according to claim 1, characterised in that, with the chain joint unstressed, a clearance (a) which can be reduced by stress is present in each case between that holding tooth (7,17; 34) of the inner leg (4) which is located most closely to the end of the inner leg (4) and the associated holding tooth (6; 16; 33) of the outer leg (3).

3. Chain joint according to claim 2, characterised in that the clearance (a) is 0.01 to 0.1 mm.

4. Chain joint according to claim 3, characterised in that the clearance (a) is about 0.05 mm.

5. Chain joint according to claim 1 or 2, characterised in that the holding teeth (5-8; 14-19; 30-37) are undercut.

6. Chain joint according to claim 1 or 2, characterised in that the sides, facing the inner legs (4) of the outer legs (3) have a concave shape and the sides, facing the outer legs (3), of the inner legs (4) have a convex shape, or vice versa.

7. Chain joint according to claim 1 or 2, characterised in that the number of holding teeth (14-16, 17-19) per outer and inner leg (3,4) is three.

8. Chain joint according to claim 7, characterised in that its pitch t is greater than 3d and smaller than 4d, d being the diameter of the adjoining chain links and the pitch t being defined as the maximum inner length of said chain joint.

9. Chain joint according to claim 1 or 2, characterised in that at least two tips (44-46) of at least three holding teeth (38-40) of each inner leg (4) and each outer leg (3) are located in each case on a circular arc.

10. Chain joint according to claim 9, characterised in that the apex of the circular arcs points in each case towards the centre of the chain joint.

11. Chain joint according to claim 9, characterised in that the apex of the circular arcs points in each case away from the centre of the chain joint.

12. Chain joint according to claim 1 or 2, characterised in that the tooth height $h_1$ of the mutually associated thicker holding teeth (48,51) is greater than the tooth height $h_2$ of the mutually associated thinner holding teeth (49,50; 47,52).

13. Chain joint according to claim 1 or 2, characterised in that the supporting element (13,56) supports the joint halves (1,2) only in the zone of the holding teeth (5,8; 15,18; 31,32; 35,36) of thicker design.

14. Chain joint according to claim 1 or 2, characterised in that the supporting element (13) is formed by a cylindrical bolt, the axis of which is perpendicular to the plane of the joint.

15. Chain joint according to claim 1 or 2, characterised in that the supporting element (13,56) is held in its supporting position by a locking element.

16. Chain joint according to claim 1 or 2, characterised in that the locking element is designed as an expansion element (12; 20; 27).

17. Chain joint according to claim 16, characterised in that the expansion element (12; 20; 27) can be locked in its expanded position by the supporting element (13; 21; 28).

18. Chain joint according to claim 17, characterised in that the expansion element (12; 20; 27) is elastic.

19. Chain joint according to claim 18, characterised in that the expansion element (12; 20; 27) is designed as a tensioning sleeve.

20. Chain joint according to claim 16 characterised in that engagement recesses (11) for the expansion element (12; 20; 27) are provided on the mutually facing sides (10) of the inner legs (4).

21. Chain joint according to claim 16, characterised in that the expansion element (53) is designed as a substantially U-shaped tensioning shackle with engagement legs (54,55).

22. Chain joint according to claim 18, characterised in that the expansion element (57) can be forced apart by at least one supporting element (58,59) having the shape of a wedge.

23. Chain joint according to claim 22, characterised in that the expansion element (20; 27) and the supporting element (21; 28) form a pre-assembled unit.

* * * * *